US010116167B2

(12) United States Patent
Pomp-Melchers

(10) Patent No.: US 10,116,167 B2
(45) Date of Patent: Oct. 30, 2018

(54) INDUCTIVE POWER TRANSMISSION DEVICE

(71) Applicant: FRIWO Gerätebau GmbH, Ostbevern (DE)

(72) Inventor: Tobias Pomp-Melchers, Münster (DE)

(73) Assignee: FRIWO Gerätebau GmbH, Ostbevern (DE)

( * ) Notice: Subject to any disclaimer, the term of this patent is extended or adjusted under 35 U.S.C. 154(b) by 582 days.

(21) Appl. No.: 14/289,014

(22) Filed: May 28, 2014

(65) Prior Publication Data

US 2014/0354065 A1     Dec. 4, 2014

(30) Foreign Application Priority Data

May 28, 2013 (EP) ..................... 13002764

(51) Int. Cl.
*H02J 50/12* (2016.01)
*H01F 38/14* (2006.01)
*H02J 7/02* (2016.01)

(52) U.S. Cl.
CPC .............. *H02J 50/12* (2016.02); *H01F 38/14* (2013.01); *H02J 7/025* (2013.01)

(58) Field of Classification Search
None
See application file for complete search history.

(56) References Cited

U.S. PATENT DOCUMENTS

| 2011/0012556 A1* | 1/2011 | Lai | ........................... A63F 13/08 |
| | | | 320/108 |
| 2012/0244822 A1* | 9/2012 | Kim | ........................ H02J 5/005 |
| | | | 455/90.1 |
| 2012/0267960 A1* | 10/2012 | Low | ..................... H04B 5/0037 |
| | | | 307/104 |

FOREIGN PATENT DOCUMENTS

| CN | 201510739 | 6/2010 |
| JP | 2008-236968 | 10/2008 |
| JP | 2010-073689 | 4/2010 |
| JP | 2010-161882 | 7/2010 |
| JP | 2012-504931 | 2/2012 |

(Continued)

OTHER PUBLICATIONS

Japanese Patent Office Action for Application No. 2014-108290 dated Jul. 28, 2015 (8 pages, English translation included).

(Continued)

*Primary Examiner* — Daniel Kessie
*Assistant Examiner* — Swarna N Chowdhuri
(74) *Attorney, Agent, or Firm* — Michael Best & Friedrich LLP

(57) ABSTRACT

A power transmission device for inductive energy transfer. The power transmission device comprises a first stage adapted to be connected to a supply input voltage and adapted to convert the supply input voltage to an operating voltage. The power transmission device further includes a second stage comprising a resonant circuit connected to the first stage and adapted to generate an oscillating voltage from the operating voltage so as to generate a magnetic field for inductive transfer of energy from the power transmission device to a target device. A control circuit is connected to the second stage. The control circuit is adapted to detect a parameter value of the second stage and is adapted to start or stop amplification of the resonant circuit based on the detected parameter value.

19 Claims, 10 Drawing Sheets

(56) References Cited

FOREIGN PATENT DOCUMENTS

WO  2005109598 A1  11/2005

OTHER PUBLICATIONS

Chinese Patent Office Action for Application No. 201410232015.0 dated Dec. 3, 2015 with translation(15 pages).
European Search Report for European Application No. 13002764 dated Oct. 21, 2013 (2 pages).

* cited by examiner

INDUCTIVE POWER TRANSMISSION DEVICE

BACKGROUND OF THE INVENTION

The present invention relates to a power transmission device for inductive energy transfer, that can operate at a wide range of voltages and that has reduced energy losses.

The principle of inductive energy transfer serves in a plurality of applications as physical basis of technical development of a large number of applications. A schematic illustration of a system for inductive energy transfer is shown in FIG. 1. An essential element in case of an inductive energy transfer is a loosely coupled conductor, which represents magnetic coupling of an inductor or a magnetic winding in the base part or charger or power transmission device 102 with an inductor or a magnetic winding in the mobile part 104 (target device). FIG. 1 (a) shows a power transmission device during operation, when energy is transferred between the base part 102 and the mobile part 104. This energy can be utilized to enable functionality of the mobile part 104. Alternatively the inductively transferred energy can be buffered in accumulator batteries (for modern applications mostly Li-ion accumulators, although further types of accumulator batteries like lead-, NiCd-, NiMh-types can be used). If the mobile part 104 is removed from the base part 102 as shown in FIG. 1b, the energy transfer is interrupted. The mobile part 104 is then supplied by the previously charged internal energy storage or remains in inactive state until the next contact with the base part 102.

When the mobile part 104 is positioned close to the base part 102, a magnetic coupling between the base part and the mobile part can be obtained so as to allow energy transfer from the base part to the mobile part. The most popular example of such an inductive charging system is the electric toothbrush, which enables contactless charging of the toothbrush as mobile part 104. In this context the term contactless is used to indicate that energy transfer can be realized without any electrical connection between corresponding electrical contacts on the mobile and the base part respectively.

Omission of electrical contacts is of great importance for many applications in different areas of application. This applies specifically to applications with high demands in the mechanical set up of the electric connections between the power source and sink in which technically complex plugs and cables can be avoided by application of inductive energy transfer (IE). Further, technical energy supply system components based on IE can be protected from environmental impacts without making the mechanical set up unnecessarily complex by appliance of outsourced connectors. Moreover, in some application areas for IE, the use of electrical connections has to be avoided in light of technical feasibility. For example, in explosion prone environments or during operation of the system components in conductive and/or aggressive media it may be technically advantageous to rely on systems that allow contactless energy transfer. Furthermore, the use of IE can improve the reliability of systems in which the devices and eventually the electrical contacts of these devices are exposed to high stresses. This is the case on the one hand for systems with rotating or moveable parts, since components based on IE allow avoiding the use of wiper contacts, which are prone to wear due to friction. In addition, IE technologies can be advantageously used in devices with connectors, which would have to be otherwise dimensioned for a plurality of plugs.

FIG. 2 shows a configuration of the power section of a system comprising a charger and a target device capable of inductive energy transfer based on a resonant DC to DC converter according to the state of the art. Besides this, further converter types based on transformers are known (flyback, forward, CUK, asymmetric half bridge etc). The input voltage $V_i$ is cut up by a switch bridge 106 into a high frequency AC voltage. This switch bridge 106 consists of a half bridge, or full bridge, wherein semiconductor switches are used as active components. The AC voltage generated by the switch bridge is applied to the primary side of the loosely coupled transformer 110. On the primary side and the secondary side of the transformer are provided reactive components, which are schematically depicted as resonant circuits 108 and 112. As a general rule, a series capacity is integrated in the primary side although further reactive components can be provided for controlling the frequency properties of the primary circuit.

On the secondary side usage of additional reactive components can be omitted although further capacities for compensating the main inductance of the conductor can be used in parallel as well as in series circuits. Moreover, additional reactive components can be also used for controlling the frequency characteristics of the secondary side.

The secondary current is rectified on the output side at a rectifying circuit 114. The rectifying circuit 114 can be configured to perform a half way rectification or a full way rectification. The components of the rectifying circuit 114 can be conventional diodes as well as semi-conductor switches (synchronous rectification). The rectified output current is smoothed with the help of a filter 116, which can optionally include an inductance.

SUMMARY OF THE INVENTION

In light of the increasing attention to environmental sustainable solutions for consumer items, in particular electronic items, also the efficiency of battery chargers assumes a fundamental importance in the design of electronic consumer items. In addition, legislation pushes manufacturers of electronic devices to develop electronic devices that show reduced power consumption. In particular, reducing the power consumption of battery charger due to losses occurring when the portable device is not connected to the battery charger or when the portable device is not being charged because the battery is already full (no-load condition) may significantly increase the efficiency of the electronics item.

In addition, with the increasing penetration of different markets around the world by electronics consumer items, including devices using the principles of IE, it is of highest interest to develop devices that can be connected without risk to different power lines. Therefore, there is a need to develop a battery charger that can be connected to a wide range of input voltages.

The object of the present invention is, therefore, to develop an inductive transmission power device that can operate at a wide range of input voltages and that shows a reduced power consumption under no-load conditions.

The present invention provides, therefore, a transmission power device for contactless inductive energy transfer including a resonant circuit adapted to magnetically couple the transmission power device to a target device and a control circuit. The control circuit can monitor the resonant circuit and control same so that losses due to the switching of the operation mode of the resonant circuit when the transmission power device changes from charge to no-load mode are almost zero.

In particular, the present invention provides a power transmission device for contactless inductive energy transfer. The power transmission device comprises a first stage adapted to be connected to a supply input voltage and adapted to convert the supply input voltage to an operating voltage, the supply input voltage may be a wide-range voltage. The power transmission device further includes a second stage comprising a resonant circuit connected to the first stage and adapted to generate an oscillating voltage from the operating voltage so as to generate a magnetic field for inductive transfer of energy from the power transmission device to a target device. A control circuit is connected to the second stage. The control circuit is adapted to detect a parameter value of the second stage and is adapted to start or stop amplification of the resonant circuit based on the detected parameter value.

The energy transfer may occur via an air gap in case of a contactless energy transfer. Alternatively, the power transmission device of the invention can also work on contact. In particular, by reducing the distance between a primary and a secondary coil to zero and by implementing a ferrite around them, a transformer with a high coupling factor from the primary to the secondary coil may be obtained. However, also in this case there will be galvanic separation for inductive energy transfer. Therefore, in case of a contact version of the power transmission device, energy transfer can occur directly without an air gap.

The operating voltage may be a DC voltage, for permanent oscillation. Alternatively the operating voltage may be a rectified AC sine wave. In the second case amplification and oscillation is possible as long as the sine wave, for instance a 50 Hz sine wave, combined with the resonant circuit voltage level is below the maximum acceptable voltage of the amplification transistor. In this configuration, the zero voltage switching is still active, thereby producing low amplification losses.

In the power transmission device of the invention, the control circuit may compare the detected parameter with a predefined threshold value and start or stop amplification based on the comparison result.

Specifically, the parameter value may be a mean voltage value across the resonant circuit and the control circuit may be configured to start amplification of the resonant circuit if an actual mean voltage is below a voltage threshold value.

Alternatively, the parameter value may be a peak voltage value across the resonant circuit. The control circuit may sense the peak voltage and may start amplification of the resonant circuit if the sensed peak voltage is below a voltage threshold value.

In a yet alternative realisation, the parameter value may comprise a peak voltage value and a rising time thereof across the resonant circuit. The control circuit may sense the peak voltage and the rising time and may be configured to start amplification of the resonant circuit if the sensed peak voltage and rising time is below a voltage threshold value after a specified time.

In the power transmission device of the invention, the voltage threshold value may be a previously measured voltage value and the control circuit may be configured to start amplification if the actual mean voltage input is smaller than the previously measured mean voltage value.

In an alternative embodiment, the parameter value may be an input current input from the first stage to the second stage and the control circuit may be configured to start amplification of the resonant circuit an actual sensed input current is larger than a current threshold value.

Advantageously, the current threshold value may be a previously measured current input to the second stage and the control circuit may be configured to start amplification of the resonant circuit when the actual input current is larger that the previously measured input current. Indeed, when an additional load, such as a target device is inductively coupled to the power transmission device, the current rises compared to the no-load state, when only the resonant circuit was load. The current sensing may be repeatedly done and if the current value is to low amplification is stopped for a predefined time.

In the power transmission device of the invention, the second stage may further include a switching element connected to the resonant circuit, the switching element being adapted to start or stop amplification of the resonant circuit. Specifically, the switching element performs the amplification of the energy level within the resonant circuit so as to start or stop amplification of the resonant circuit.

The switching element may be switched off for stopping amplification of the resonant circuit, wherein the switching/amplification element is switched on when the voltage across the switching element is at a minimum value across the switching/amplification element. In addition or alternatively, the switching/amplification element may switched off for starting amplification of the resonant circuit, wherein the switching element is switched on when an output current of the switching element is at a predetermined value.

In the power transmission device of the invention, the first stage may include a dimming section configured to decrease the input voltage to a predefined operating direct current voltage. Advantageously, the dimming section may include a high ohmic Mos-Fet element. This choice allows to reduce switching losses.

In addition or alternatively, the resonant circuit may be designed so as to include a capacitor and a choke connected in parallel.

In the power transmission device according to the invention, the control circuit may stop amplification for a predefined off-time and the ratio of the off-time with a period of the oscillating signal may be advantageously chosen so as to minimize losses of the first stage. The off-time may be e.g. 500 mS off-time and the on-time for performing detection may be 2 mS. According to a further embodiment, the present invention may include a system for inductive energy transfer.

The system comprises a power transmission device as described above and a target device. The target device is adapted to be magnetically coupled to the power transmission device for transfer of energy from the power transmission device to the target device.

In a preferred embodiment the power transmission device may sense an opposing magnetic field of a power receiving coil in the target device to which the power is transferred, the opposing magnetic field being sensed through the detected parameter value.

In the system for inductive energy transfer a magnetic decoupling of the power receiving coil may be activated by switching the power receiving coil electrically to a high ohmic load and/or by electrically opening one or both wire ends of the power receiving coil to disconnect said one or both wire ends from the low ohmic load. The magnetic decoupling triggers the less power consuming no-load mode.

The concepts underlying the present invention can additionally be used for power transfer in common plug connected power supplies with a transformer since the secondary coils can also be part of one transformer together with the primary one. As long as there is no load magnetically coupled to the secondary coil the same set up is build like having an inductive concept, in which there is no handheld or target device with coil inside the primary magnetic field.

For a better understanding of the present invention, said invention will be explained with reference to the embodiments depicted in the following figures. Therein equal parts are provided with equal reference signs and equal component labels. Furthermore, particular features or combinations of features from the depicted and described embodiments can be considered individually and can provide independent inventive solutions according to the invention.

DETAILED DESCRIPTION

Figure 1:
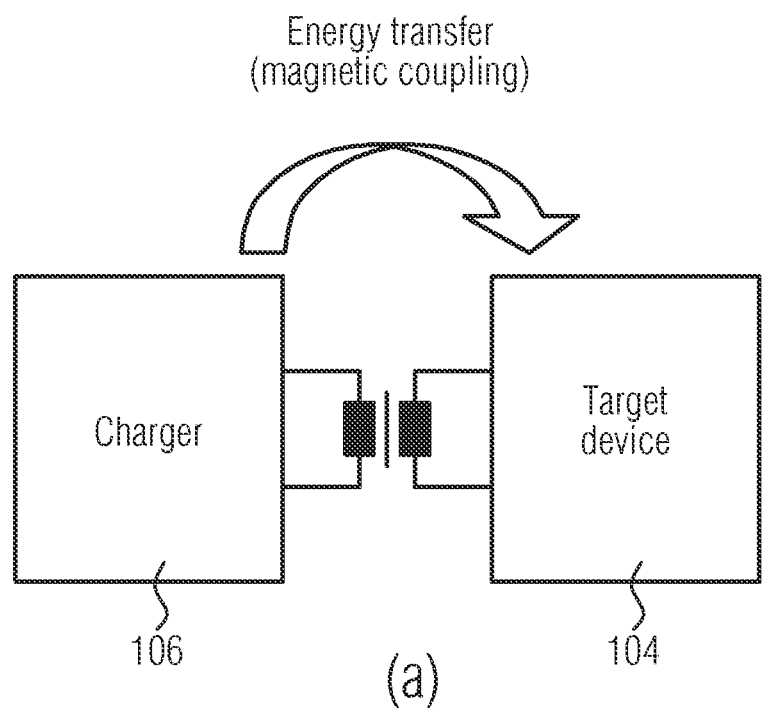
FIG. 1 shows a schematic diagram of a subdivision of a system using the principles of inductive energy transmission according to the state of the art.
Figure 1:
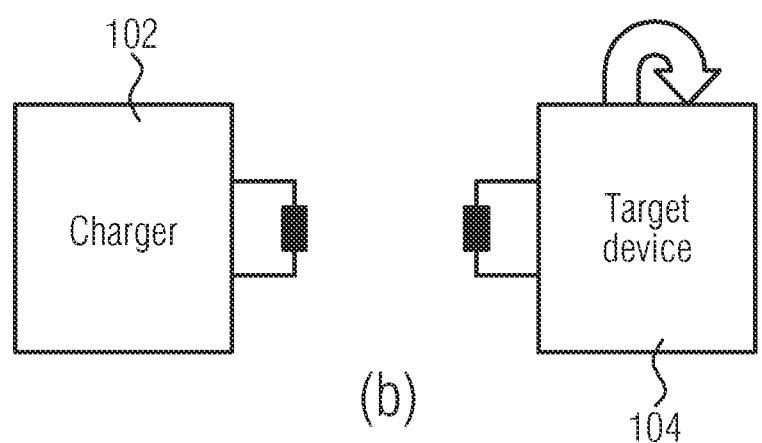
Figure 2:
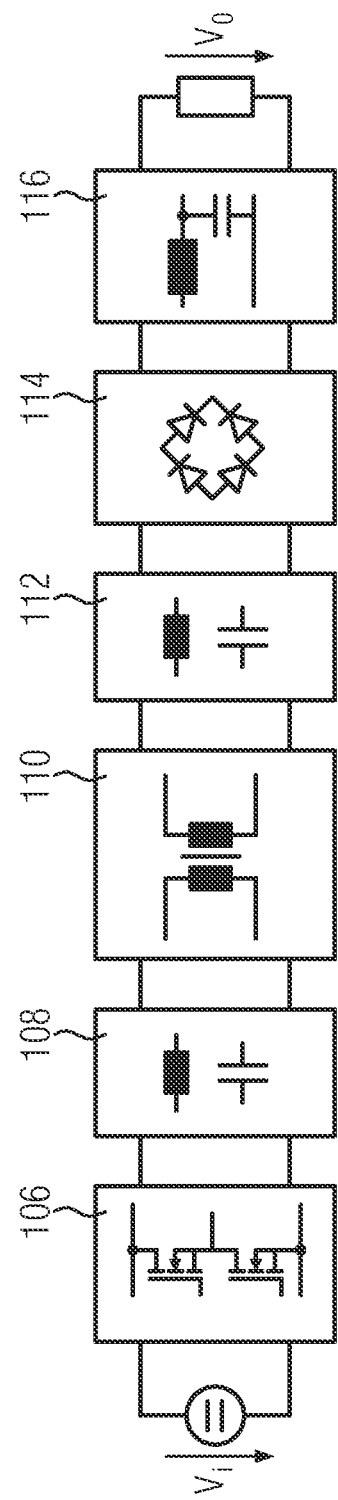
FIG. 2 is a schematic drawing showing a composition of a system for inductive energy transmission using a resonant DC-DC converter according to the state of the art.

In the following description, the term permanently or permanent used in connection with the status of the switching element or of with the amplification means that the switching element/amplification will maintain his status without any change as long as the condition that caused said status is verified. Similarly, the term the continuous referred to the amplification is referred means that the system is continuously amplified during the time window in which the amplification is on.

The present invention is based on the need of developing electronic tools that comply with the latest regulations in terms of energy consumption. For the reasons explained above, the present invention is based on the observation that inductive battery chargers—commonly used for contactless charging of batteries in hand held tools (target devices)—are responsible for increased energy consumption due to energy losses. As already mentioned above, the term contactless is used herein to indicate that energy transfer can be realized without any electrical connection between corresponding electrical contacts on the mobile and the base part respectively. Although in the present invention energy transfer may occur in a contactless manner via an air gap, the power transmission device of the invention can also work on contact. In particular, by reducing the distance between a primary and a secondary coil to zero and implementing a ferrite around them, a transformer with a high coupling factor from primary to secondary may be obtained. However, also in this case there will be galvanic separation for inductive energy transfer. Therefore, in case of a contact version of the power transmission device, energy transfer can occur directly without an air gap. Even when the following description refers to contactless energy transfer, in has to be understood that the power transmission device of the present invention can also work on contact as described above.

The energy losses responsible for a high energy consumption mostly occur during stand-by of the charger (idle running of the Charger), when the charger is not connected to any load, such as a target device, energy consumption can still be quite high due to internal losses of the power transmission device. These losses could be, for instance due to the energy consumption of a resonant circuit of the power transmission device used for generating the magnetic field used for coupling the power transmission device with a target device. On the other hand, if the current fed to the resonant circuit is set to be low so as to reduce losses during no-load operation, the transmission power of the resonant circuit results to be reduced even when a target device is magnetically coupled to the power transmission device for re-charging. This reduces the efficiency of energy transfer, resulting in a negative impact on the energy transfer between the power transmission device and the target device.

The idea of the present invention is thus to reduce the losses of the power transmission device under no-load condition, where no-load condition means that there is no magnetic coupling between the power transmission device and the corresponding hand held device (target device). This is obtained by providing the power transmission device with a control circuit configured to monitor a parameter of the resonant circuit of the power transmission device and control amplification of the resonant circuit based on the value of said parameter. Specifically, based on the variation of said parameter, the control circuit can detect the presence or not of a magnetic coupling between the power transmission device and the target device. If such a magnetic coupling is detected, the control circuit starts a preferably permanent high efficient zero voltage switching amplification of the resonant circuit, thereby increasing the efficiency of energy transfer between the power transmission device and the target device over no-load and load condition. On the other hand, when the control circuit detects no magnetic coupling between the power transmission device and the target device, amplification is stopped and only repeats starting amplification for a short time to detect new load status, so as to reduce no-load energy consumption of the power transmission device. The short time for which restart is repeated may be, for instance, 2 ms.

Further, the present invention is based on the observation that common power transmission devices for contactless inductive energy transfer, such as inductive battery chargers, can only operate at a specific supply voltage. Therefore, the use of electronic tools having such battery charger is limited to those environments that provide the particular grid voltage at which the battery charger can operate. This is disadvantageous for manufactures since battery chargers with different specifications need to be produced for markets in which different grid voltages are used, thereby increasing production costs.

Thus the idea of the present invention is also to implement a dimming circuit in the first stage of the power transmission device, wherein the dimming circuit is capable of converting input voltages spanning the full wide-range of grid input voltages to a predefined intermediate operating voltage Vdc or intermediate voltage.

The operating voltage may be a DC voltage, for permanent oscillation. Alternatively the operating voltage may be a rectified AC sine wave. In the second case amplification and oscillation is possible as long as the sine wave, for instance a 50 Hz sine wave, combined with the resonant circuit voltage level is below the maximum acceptable voltage of the amplification transistor. In this configuration, the zero voltage switching is still active, thereby producing low amplification losses.

Figure 3:
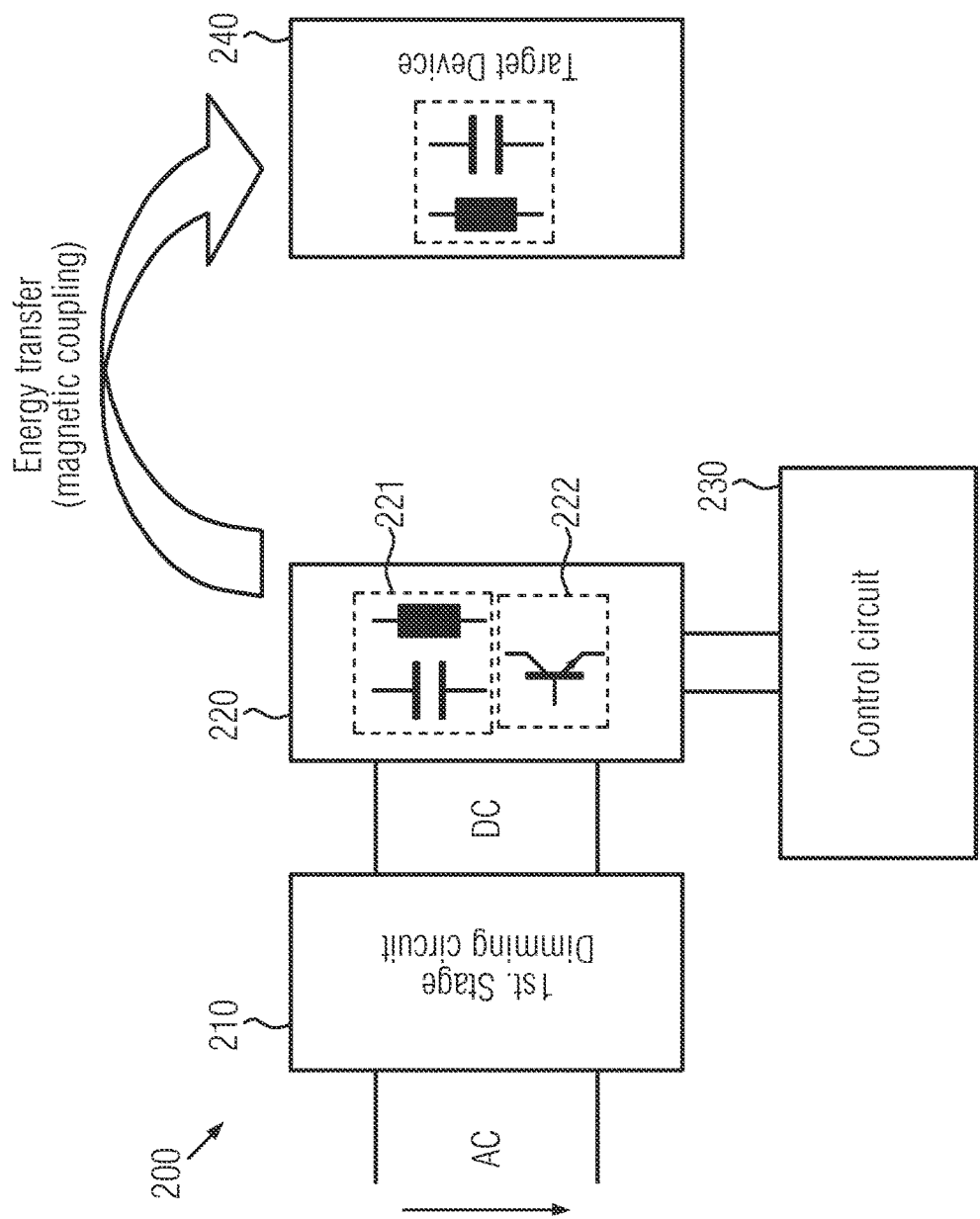
FIG. 3 is a schematic drawing showing an inductive energy transmission device according to an embodiment of the present invention.

FIG. 3 is a schematic drawing showing an inductive energy power transmission device according to the present invention. The power transmission device 200 includes a first stage 210 and a second stage 220. The first stage 210 comprises a dimming circuit (not shown in FIG. 3) configured to receive as input an alternate input voltage from an electricity grid and to convert the input AC voltage into a predefined constant intermediate voltage.

In an advantageous embodiment, the dimming circuit in the first stage may be a trailing-edge phase dimmer realised using a high Ohmic Mos-Fet transistor. This choice allows the reception, at the first stage 210, of an input voltage spanning the full wide range of input voltages that can go from 90 Vrms to 264 Vrms. Any of these input voltages will be then decreased to a predefined operating constant voltage (intermediate voltage) to be supplied to the resonating circuit. Advantageously, the operating voltage can be chosen to be an intermediate voltage of, e.g. 120 Vdc. Clearly, this choice of the operating voltage is not limiting and the system can be designed so that the resonant circuit operates at any other constant voltage. The operating voltage can be chosen based on the operational voltage of the switching element, which may me a switching transistor: the operating voltage is limited by the maximum operational voltage of the switching element. Specifically, the sum of the operating voltage and the peak of the oscillation voltage should not be higher than the operational voltage of the switching element and it should not be higher than the maximum voltage of the resonant circuit elements. Additionally to have a zero voltage switching, the peak of the oscillation voltage should be such that the difference between the operating voltage and the peak of the oscillation voltage is below 0V. The useable range of operating voltages can be determined based of the boundary conditions described above.

Building the dimming circuit with very high Ohmic components, such as a high Ohmic Mos-Fet, diodes and resistors, provides the following advantage over dimmers commonly used in electronic applications. Specifically, common dimmers are designed for controlling normal light bulbs and are composed by diodes and triodes. These components normally need high no-load current to be operative, thereby causing high no-load losses. The use of Mos-Fet transistors with a high Ohmic resistance for controlling dimming of the input voltage, allows to obtain, starting from any AC input voltage, an intermediate constant voltage, while significantly reducing losses that are normally present in solutions using common dimmer concepts.

The second stage 220 is further connected to a control circuit 230. The second stage 220 includes a resonant circuit 221, which in an advantageous embodiment may be realised using a parallel connection of a capacitor and a choke. The choke may be a common choke including two coils wound on a magnetic core. A first one of the coils could work as main inductance, while a second coil could be used for having a control signal. The oscillating circuit 221 is connected to a switching element 222. The switching element may be, for instance, a switching transistor. However, any other component capable of performing a switching operation upon a control signal may be used instead. The switching element 222 is controlled by the control circuit 230 in phase with the oscillation of the resonant circuit 221 so as to amplify the oscillation of the resonant circuit 221. Specifically, the transistor is switched on when the voltage across the transistor is at a minimum, typically around 0 volts. After the zero voltage is reached the transistor is switched on. When the collector current reaches a pre-determined value, the transistor is switched off. During this time energy is transferred into the resonant circuit so as to generate a magnetic field for coupling with a target device 240. The predetermined value may be a reference voltage stored inside an application specific integrated circuit (ASIC) component in the control circuit (not shown in FIG. 3). The resonant circuit acts as an energy storage element that is fed by the current form the switching transistor. The current is given only for a short time to increase the power level within the resonant circuit. Since the control circuit monitors the voltage across the switching element 222, the switching element 222 can be operated when switching losses are at minimum (almost 0). By stopping the amplification for a predefined time at the end of a short detection period, if there is no magnetically coupled load, resulting in a quick rise and overshot of the energy and voltage within the resonant circuit it is possible to reduce no-load power losses. The detection period may be, for instance 2 ms. In this way, losses during no-load can be significantly reduced, while the efficiency in energy transfer can be increased.

The control circuit 230 is connected to the resonant circuit 220 to control operation of the resonant circuit 220. The control circuit 230 may include a detecting circuit (not shown in FIG. 3) adapted to detect the presence of a secondary load (target device) coupled to the power transmission device 200. During detection amplification of the resonant circuit is enabled and the increase of voltage (and therefore energy) inside the resonant circuit is monitored. Under no-load condition, the voltage increases very fast to a level, which is above the predetermined value for which amplification is stopped. In this case amplification stops and a restart procedure begins which is much longer than the detection time. The restart procedure is a discharge and charging procedure of an energy storage element. The energy storage element may be e.g. a capacitor. A possible arrangement will be described later on with reference to FIG. 4. Accordingly, the power consumption in standby/detection mode is reduced.

On the other hand, if a handheld or target device is present, the increase of the voltage or equivalently of the energy inside the resonant circuit is reduced. Thus the predetermined value is not reached and a continued charging mode will start. If the control circuit detects the presence of a load, the amplification at zero voltage, which may be preferably permanent, through the switching element 222 will source the resonant circuit 221 so as to generate a magnetic field for establishing a magnetic coupling with the target device 240. If no secondary load is detected, the control circuit controls the resonant circuit 221 through the switching element 222 so as to stop amplification of the resonant circuit 221. The period of time during which amplification is stopped is called off-time. During off-time the oscillation voltage level decreases due to internal losses. The power consumption of the power transmission device 200 of the present invention can be adjusted based on the ratio of the OFF-time to the OFF+ON-time of the amplification of the resonant circuit (period of the oscillating signal). This time may be e.g. 500 mS off-time and 2 mS on-time (for detection). The parameter can be adjusted to minimize the losses while detecting the presence of a load.

According to an advantageous embodiment, the detection of the presence of a load, such as a target device 240, coupled with the power transmission device 200 can be carried out by monitoring one or more parameters of the resonant circuit 221. A variation of such parameters indicates the presence or not of a load. Specifically, the measured parameter may be compared to a predefined threshold value. If the measured parameter is above or below said threshold, the control circuit 230 detects the presence of a load and controls the switching element so as to start amplification.

As an example, the voltage across the resonant circuit directly or sensed by an additional magnetically coupled separate winding may be compared with a voltage threshold value. The voltage threshold value may be a predefined value chosen based on design parameters of the circuit or it may be a voltage value previously measured across the resonant circuit 221. If the measured voltage is smaller than the voltage threshold value the control circuit 230 controls the switching element 222 so as to start preferably permanent amplification of the resonant circuit 221.

Specifically, in the case that a load is coupled to the power transmission device, the wave form output at the resonant circuit 221 will be attenuated. Consequently, the mean voltage value detected across the resonant circuit 221 will decrease compared to the mean voltage value detected under no-load condition. Upon detecting a decrease in the mean voltage value across the resonant circuit or the peak level at the additional winding, the control circuit 230 will control the switching element so as to start amplification of the resonant circuit. On the other hand, upon detecting an increase in the mean voltage value or peak voltage level, meaning that the power transmission device is being operated under no-load conditions, the control circuit 230 will control the switching element 222 so as to stop amplification of the resonant circuit 221.

More precisely, the detection may be carried out in the following manner. Upon start of the oscillation the resonant circuit 221 is amplified and the voltage level of the resonant circuit 221 rises. Each time the switching element 222 switches (zero voltage switching) additional energy is added into the resonant circuit and stored therein by increasing the voltage level within the resonant circuit. When the target device 240 is being recharged, the magnetic windings in the power transmission device 200 and in the target device 240—respectively indicated as primary and secondary coils—will be magnetically coupled. Upon magnetic coupling of the secondary coil to the primary coil the raising speed and level of the voltage will be reduced because the secondary coil consumes a part of the energy which is within and which is transferred into the resonant circuit 221. Therefore, the oscillation voltage level, which may be an example of measured parameter, will not overshoot the predefined threshold value. The predefined threshold value may be in this case an internal voltage regulation level of an integrated circuit within the control circuit 230 (not shown). As long as the oscillation voltage level stays below this voltage regulation level the amplification continues.

In case that the target device 240 is not being recharged, there is no magnetic coupling between the secondary coil in the target device 240 and the coil in the power transmission device 200. Accordingly, the voltage within the resonant circuit 221 rises much faster. This causes the measured parameter—in this case the oscillation voltage level which is sensed delayed in the control circuit 230—to overshoot the predefined threshold value. The amplification stops (see FIG. 5, time A) until the oscillation voltage level decreases below the predefined threshold value. This overshoot above regulation voltage causes a restart of the IC within the control circuit 230 (not shown) because an enable Pin of the IC is hold on a stored negative voltage. The negative voltage can be stored in a capacitive element during a rise of the voltage level within the resonant circuit at startup. The duration of the overshoot allow the parasitic consuming elements of the resonant circuit to consume the stored energy. Additionally a voltage stored during the overshoot decreases below the predefined threshold value, and amplification starts again but only for one time. This voltage may be stored in a capacitive element connected at a pin of the IC. A comparison of oscillation voltage level and the stored negative voltage is carried out (see FIG. 5, second rise of voltage after first high oscillation level). Since the oscillation voltage level is to low to enable the next amplification the IC waits for this enable and restarts. During the off-time the negative voltage is discharged so that at next startup the enable can occur.

In a particular example, the target device that has to be recharged may include a 1 pulse rectifier connected to the resonant circuit 240. When such a target device is coupled to the power transmission device, one half of the wave form output from the oscillation circuit 221 is attenuated. This attenuation causes a decrease in the mean voltage and peak voltage value across the resonant circuit 221. In this manner, the control circuit can detect the presence of the target device 240 coupled to the power transmission device 200.

Alternatively, detection of a secondary load (target device coupled to the power transmission device) can be performed by monitoring the current input to the resonant circuit 221. As soon as the target device 240 is magnetically coupled to the inductance of the resonant circuit 221, the current sensed at the input of the resonant circuit 221 will increase. Upon sensing of the increase during detection mode in the current input into the resonant circuit 221, the control circuit 230 will control the switching elements so as to start preferably permanent amplification of the resonant circuit. On the other hand, upon a decrease in the sensed current—connected to the absence of a magnetic coupling between the target device 240 and the power transmission device 200—the switching element 222 will be controlled by the control circuit 230 so as to start the off-time, during which amplification of the resonant circuit 221 is stopped.

FIG. 3 also show a system comprising the power transmission device 200 and a target device 240. The target device 240 is adapted to be magnetically coupled to the power transmission device 200 so as to transfer energy from the power transmission device 200 to the target device. The system including the power transmission device 200 and the target device 240 may sense the opposing magnetic field of a power receiving coil (not shown) in the target device 240 to which the power should be transferred to. The opposing magnetic field may be sensed by detecting changes in the parameter value as described above and as will be discussed in detail with reference to FIG. 4.

In the system for inductive energy transfer a magnetic decoupling of the power receiving coil which triggers the less power consuming no-load mode, is activated by switching the power receiving coil electrically to a high ohmic load and/or by electrically opening one or both wire ends of the power receiving coil to disconnect said one or both wire ends from the low ohmic load. In this manner, the opposing magnetic field is strongly attenuated or not available any more and creates the same situation as decoupling the power receiving coil by placing it far away from the coil in the resonating circuit of the power transmission device creating the magnetic field so that the opposing magnetic field is also strongly attenuated.

Figure 4:
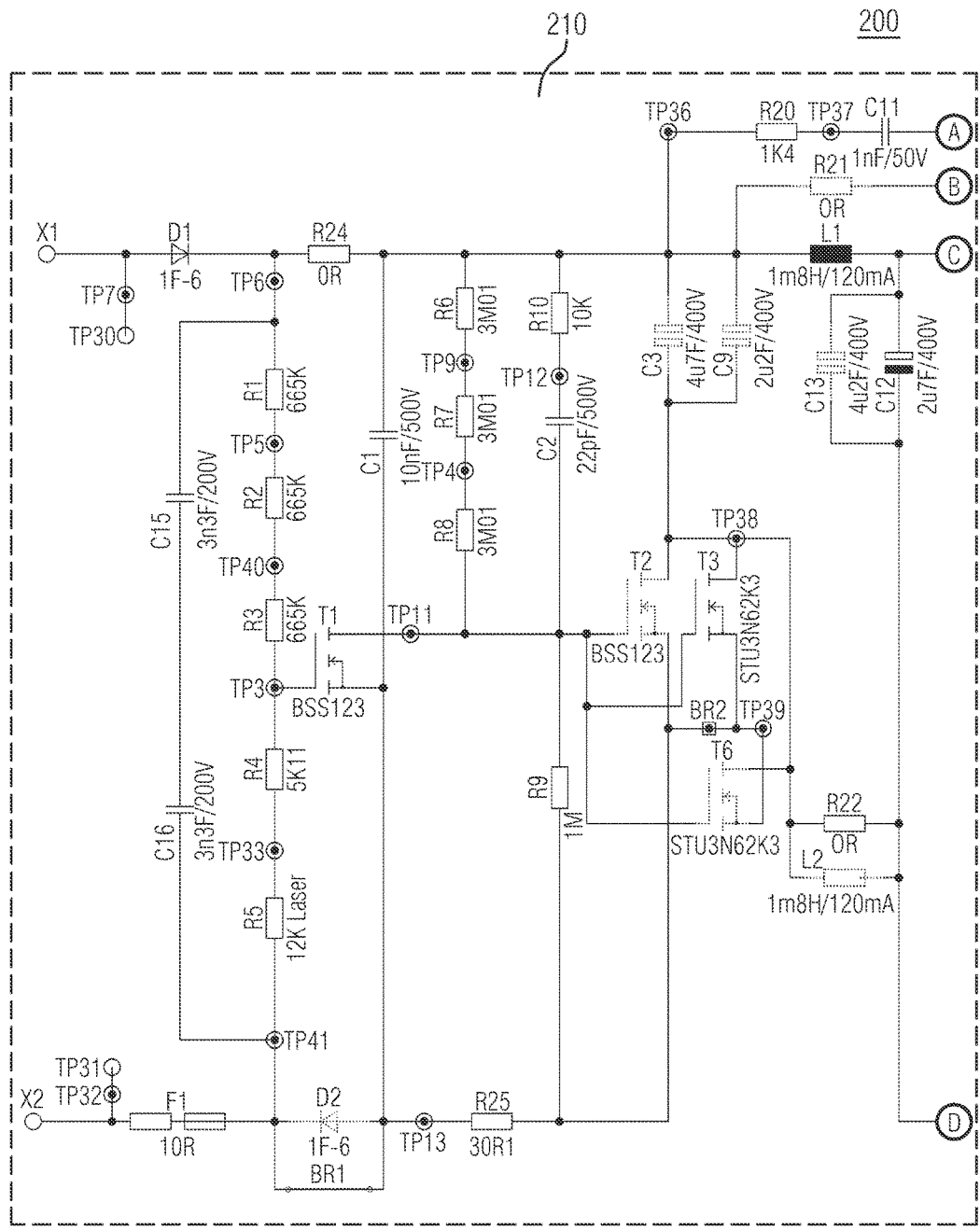
FIG. 4 shows a circuit diagram describing a possible realization of a power transmission device according to an embodiment of the present invention.
Figure 4:
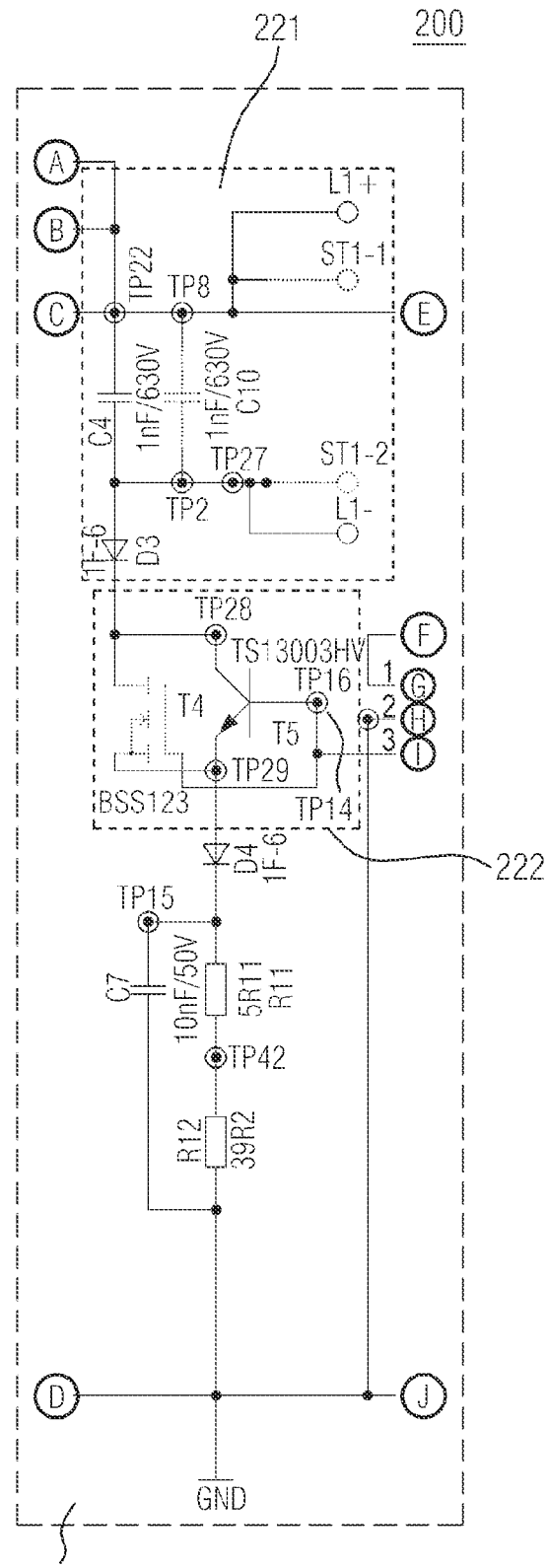
Figure 4:
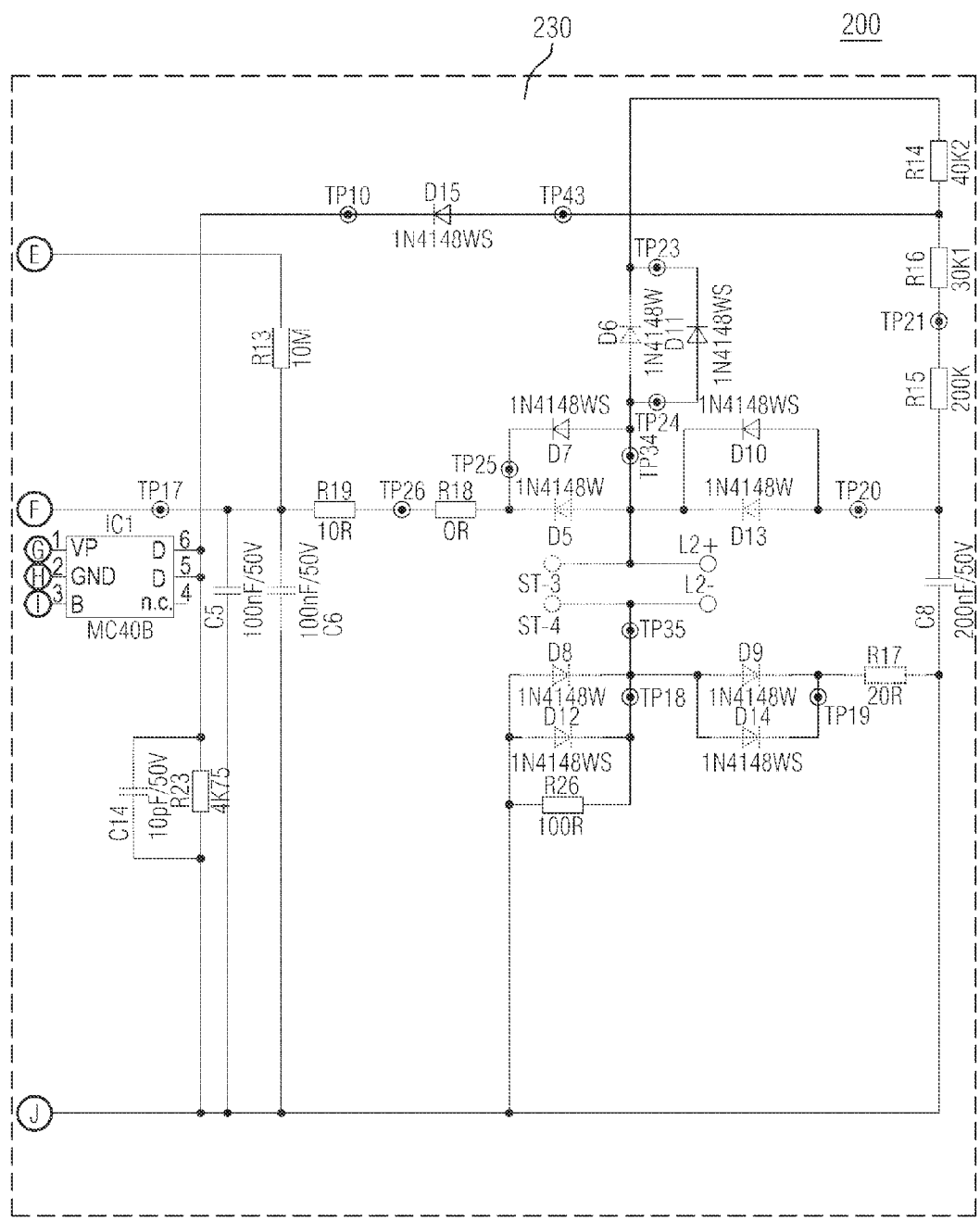

FIG. 4 shows a circuit diagram describing a possible realization of a power transmission device according to an embodiment of the present invention. The parts of the circuital diagram corresponding to the first and second stages 210, 220 and to the control circuit 230 are identified by dotted boxes. The first stage 210 includes a 1 pulse rectifying circuit comprising the diode D1. The transistor T3 (alternatively T2 or T6) is switched on directly—the gate capacity is charged by R10 and C2—at the beginning of each rectified pulse and held on through R6, R7, R8 and R9. A capacitor C12 is connected via a MOS-Fet T3 and other elements in series to the grid. During this time the voltage the capacitor C12 rises following the sine wave pulse voltage. The MOS-Fet T3 continues conducting until the sine wave voltage divided by the resistors R1, R2, R3, R4 and R5 rises above T1 gate source threshold voltage. At this moment T1 becomes conducting, discharges the gate-source capacitor of T3 and disables it preferably in a permanent manner as long as the transistor T1 conducts. In order to ensure that the transistor T1 will not become high ohmic again (non conductive), thereby enabling the transistor T3—which is responsible for losses (sin 90° to 180°)—, before the sine wave pulse drops below 0V (sin 180° to 360°), then the capacitor C1 as well as C15 and C16 store the sine wave voltage level for a predetermined time. The predetermined time goes from the time the transistor T3 is switched off to the time the sine wave drops below 0V. Nevertheless, the voltage level decreases of an amount that is enough so that the next sine wave pulse can be used to recharge the capacitor C12 again. The fact that the capacitor is not completely recharged allows to reduce losses. The capacitors C1, C15 and C16 together with the resistors R25 and the transistor T3 Rds-on may be additionally used to attenuate conductance disturbances (EMI). The fusible-resistor F1 as well as the included thermal fuse ensure a safe stop of operation in case of a fault. F10 additionally reduces the surge capability.

The capacitor C12 is connected to the resonant circuits 210 in the second stage 220 and provides the constant predefined voltage to the resonant circuit 221. Specifically, the reference intermediate voltage, which is stored in the capacitor C12, powers the resonant circuit in the second stage of 220 without being further converted. In the particular design depicted in FIG. 4, the resonant circuit 221 is composed by the parallel connection of the capacitor C4 with a winding including coils L1 and L2 wound around a core (not shown). In the implementation described in FIG. 4 transistor T5, which is connected to the resonant circuit 221 through the diode D3, has the function of the switching/amplification element 222. The parallel resonant circuit 221 is powered by capacitor C12 only during the time the transistor T5 is switched on. Only during this time a current will flow from capacitor C12 to ground through the resonant circuit 221 and the transistor T5. The transistor T5 is switched on when the control circuit detects that the voltage obtained by summing the voltage stored in the capacitor C12 and the voltage across the resonant circuit is below or equal to zero. This condition can be detected by monitoring the voltage value across the transistor T5. Detection is performed by a detecting circuit 231, represented in FIG. 4 by the ASIC MC4OB. It has to be clear to the skilled person that although in the circuit of FIG. 4 the control circuit is embodied by the ASIC 231, other solutions could also be used as long as they are configured for carrying out the detection of the invention.

More precisely, when the sum of the voltage in the capacitor C12, which is the intermediate predetermined voltage and can be chosen to be around 120 Volts, and the resonant circuit voltage is zero or below, the voltage measured across the transistor T5 (or alternatively by sensing the voltage of the magnetically coupled L2) becomes equal or smaller than zero. In this manner the control circuit can detect when a voltage across T5 is below or equal to zero and can thus switch on the transistor T5, when its voltage is zero or below. The aforementioned switching timing allows controlling the transistor T5 and therefore the resonant circuit without losses. In other words, performing a zero voltage switching of the transistor T5 to control the resonant circuit provides the advantage of drastically reducing switching losses on the transistor.

Figure 7:
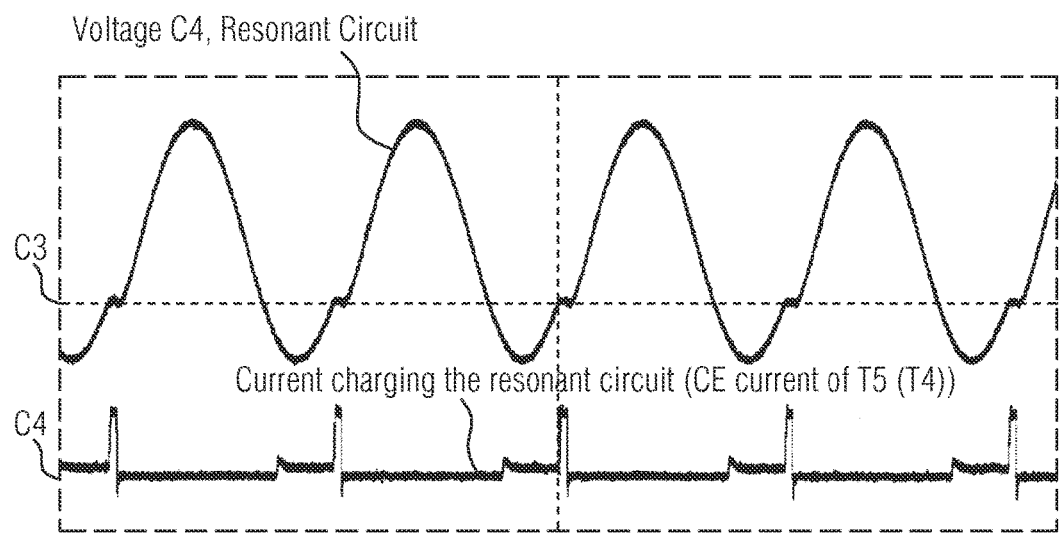
FIG. 7 shows a waveform across the resonant circuit during amplification and the corresponding current for an input voltage of 120 V under charging conditions and at a time scale of 5 μs/div according to an embodiment of the present invention.
Figure 8:
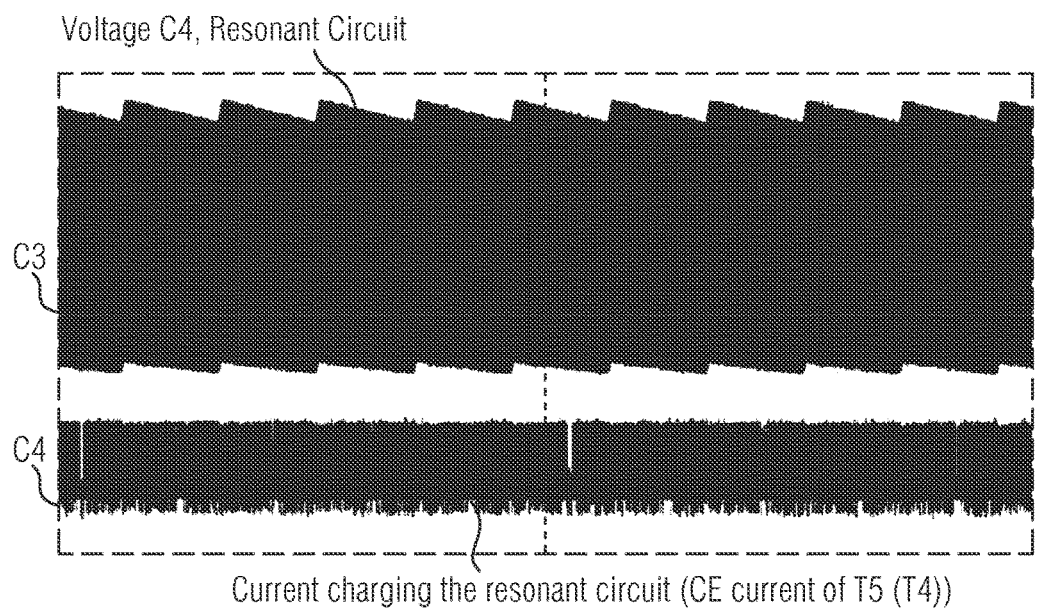
FIG. 8 is a plot of the same wave form and current of FIG. 7 at a time scale of 20 ms/div.

The zero voltage switching can be understood with reference to FIGS. 7 and 8 Specifically, these figures depict with different zooming factors the signals on the resonant circuit voltage TP2 to TP14 (channel 3) and the current through D4 (T5) (channel 4). Through these figures the working principle of the zero voltage switching as well as that of the zero switching detection can be understood.

The voltage of the resonant circuit is sensed in positive and negative peak value at L2. The positive pulse is in series low ohmically rectified by the diode D7 and subsequently high ohmically rectified by the diode D11. The negative pulse is then low ohmically rectified by the diode D10. The diode D7 powers the IC 231 and measures the peak voltage level within the resonant circuit. The signal on D7 is also used for detecting the overshoot under no-load conditions. The diode D11 is used to define the timing for the zero voltage switching. As soon as Pin D of the IC 231 (detection circuit) becomes positive and Vp is below regulation voltage the IC 231 activates the transistor T5 to start amplification. The D-Pin voltage is the sum of the negative voltage stored at the capacitor C8 and the positive voltage rectified through the diode D11. The above configuration is set in a way that the enabled state of the IC 231 is reached as soon as the voltage at the transistor T5 is below 0V. Therefore, this voltage is not directly but indirectly measured. In this manner, the oscillation process can also start when the first amplification is not strong enough to reach 0V at the transistor T5, which would cause to stop the amplification. The positive signal at pin D is stored internally in an IC or ASIC 231, which is an example of detecting circuit. Thus it needs to be applied once to enable the D pin and is reset after one amplification procedure. In this manner, the D pin can be enabled and after the signal detected at the VP pin drops below the regulation level, the transistor T5 is switched on.

In the realization depicted in FIG. 4, the zero switching point may be detected by comparing the mean or peak voltage value of the sine wave output from the resonant circuit with a voltage threshold of the IC. If the actual mean or peak voltage value is lower than the threshold value, a load—such as a target device to be recharged—is connected to the charger. In this configuration the power transmission device is charging the battery of the target device and the resonant circuit has to be amplified so as to increase efficiency (zero voltage switching) in the energy transmission. Alternatively, detection may be done by comparing the mean or peak value with a previously detected value. An example of an amplified waveform output from the resonant circuit 221 is depicted in FIGS. 7 and 8.

As already generically described with reference to FIG. 3, the control circuit 230 is connected to the resonant circuit 220 to control operation of the resonant circuit 220. The detecting circuit (ASIC) 231 is adapted to detect the presence of a secondary load (target device) coupled to the power transmission device 200. During detection amplification of the resonant circuit is enabled and the increase of voltage (and therefore energy) inside the resonant circuit is monitored. Under no-load condition, the voltage increases very fast to a level, which is above the predetermined value for which amplification is stopped. In this case amplification stops and a restart procedure begins which is much longer than the detection time. The restart procedure is a discharging/charging procedure of an energy storage element. In the shown circuit a capacitor C5 (or alternatively C6) is discharged by the pin Vp of the IC 231 and after reaching a under-voltage lock out level the IC sets this pin to be high ohmic. Therefore the resistor R13 is able to recharge the capacitor powered by the intermediate voltage until it reaches the start up level of the IC and the detection starts again.

Control of the switching transistor T5 by the control circuit 230 with reference to the circuit diagram of FIG. 4 will be described below. Upon start of the oscillation the resonant circuit is amplified and the voltage level of the resonant circuit rises. Each time the transistor T5 switches (zero voltage switching) additional energy is added into the resonant circuit and stored therein by increasing the voltage level within the resonant circuit. At the beginning before it reaches the zero voltage the transistor T5 may also switch at minimum amplitude. The amount of energy fed into the resonant circuit is adjusted by a shunt resistor R11 connected in parallel with a resistor R12. When the target device is being recharged, the magnetic windings L1, L2 (primary coil) in the power transmission device will be magnetically coupled to those in the target device (secondary coil). Upon magnetic connection of the secondary coil to the primary coil the rising speed of the voltage level as well as the resulting peak level of the voltage will be reduced because the secondary coil consumes a part of the energy which is transferred into the resonant circuit. Under this condition, the oscillation voltage level, which may be an example of measured parameter, will not overshoot the voltage level measured at the pin VP (pin 1) of the detecting circuit 231 MC40B (see also FIG. 11). Said voltage level (voltage regulation level) defines in this embodiment the predefined threshold value. As long as the oscillation voltage level stays below the voltage regulation level measured at pin VP, the amplification goes on. When the oscillation voltage level is above the regulation voltage level at the pin VP, the amplification stops until the oscillation voltage level decreases below the regulation voltage level at the pin VP.

In case that the target device is not being recharged as well as the handheld was connected and later on taken out of magnetic coupling to L1, L2, there is no magnetic coupling between the secondary coil in the target device and the primary coil L1, L2 in the power transmission device. Accordingly, the voltage within the resonant circuit rises much faster and onto a higher level. The voltage regulation level on pin VP is delayed by the RC circuit element including the series connection of the resistors R18 and R19 connected to the capacitor C5 (or alternatively C6) in the control circuit 230. Therefore, the voltage of the resonant circuit rises above the regulation level before amplification is stopped (see FIG. 5, time A). In this way the voltage rises above the voltage regulation level before the voltage level at the pin VP causes a stop of the amplification. In this manner the oscillation voltage rises above the voltage regulation level at the pin VP by an amount that causes the IC or ASIC 231 (MC40B) to stop amplification for a time that is long enough to allow the parasitic consuming elements of the resonant circuit to consume the stored energy. Consequently, the voltage decreases to a low level and amplification starts again but only for one time. This behavior can be seen in FIG. 5, where a single current peak after time A can be recognized.

In this manner, the control circuit 230 can stop amplification for a predefined off-time and the ratio of the off-time with a period of the oscillating signal can be advantageously chosen so as to minimize losses of the first stage. The off-time may be e.g. 500 mS off-time and the on-time for performing detection may be 2 mS. This is achieved by triggering a restart of the IC 231 if no load is detected during active amplification detection time. This restart time can be set e.g. to 500 mS, as already mentioned above. With reference to the circuital scheme of FIG. 4, the restart time is set by the RC element including the resistor R13 and the capacitor C5 (alternatively C6) and intermediate voltage. During restart the capacitors C5 (C6) are discharged by the IC 231 and recharged by the resistor R13 after reaching the lock out level of the pin Vp of the IC 231.

The detection process described above may also allow to implement a battery full mode or similar having the same low power consumption than that obtained with disconnected target device. Since the magnetically opposing field is used to start or stop amplification the coil within the target device only needs to be electrically disconnected from its accumulator and/or load. The coil with disconnected winding ends will not be able to create any opposing field any more and is therefore magnetically invisible for L1 L2. This results in the same behavior like having the target device taken off the base/charging station.

Figure 11:
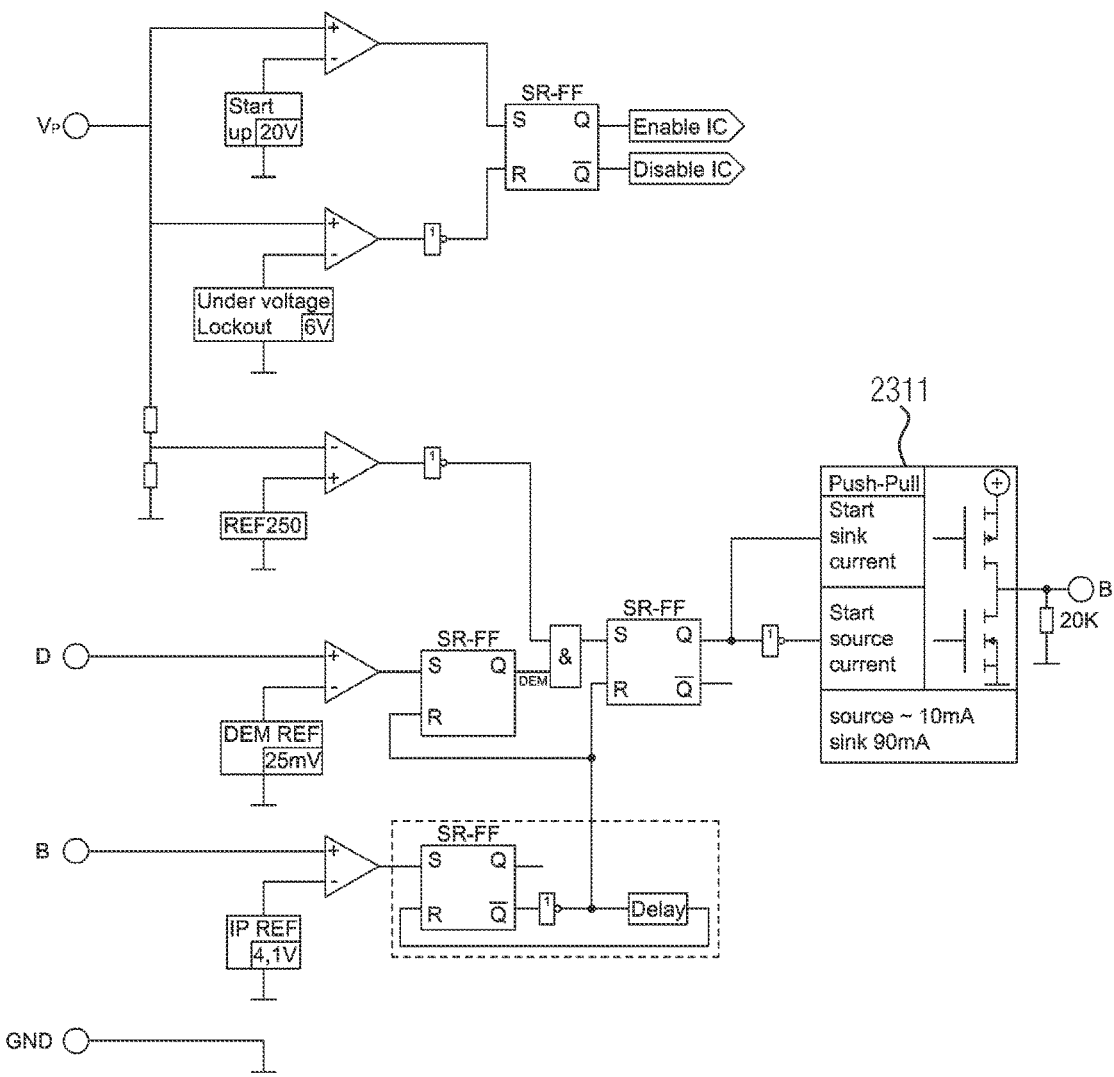
FIG. 11 shows a circuital scheme of the integrated circuit element MC40B.

Since the stored offset on the capacitor C8 is negative and one pulse summed onto the negative offset is not high enough to enable the pin D of the MC40B any more, the MC40B will not receive any further enable signal on the pin D. Consequently, the MC40B will only switch the transistor T5 one more time. As a result the MC40B goes on waiting for the enabling signal and consumes energy from the capacitor C5 until the voltage at the pin VP of MC40B goes below a under voltage lock out and becomes high ohmic on the pin VP. The under voltage lockout may be for instance 6V, as shown in FIG. 11. At this point, the voltage at the capacitor C5 rises power by the resistor R13 again until reaching start up voltage level. The start up voltage level may be, for instance 20V, as shown in FIG. 11. During this time (lock out and restart) the capacitor C8 is discharged by the series connection of the diode D10, the winding L2+ L2− and the resistor R26. Therefore at restart one pulse is able to reach a positive level on pin D of MC40B thereby enabling an ongoing amplification. The internal structure on the ASIC MC40B and the connection of the pins VP, D and B are schematically shown in FIG. 11.

In the diagram of FIG. 4, the dotted elements such as the transistors T2, T6 and the capacitor C3, C9, C13 indicate alternative arrangements. More precisely, the dotted transistor T2 may be used in the indicated position instead of the transistor T3 in an alternative implementation of the first stage 210. Similarly, capacitor C6 and the diodes D5, D6, D13, D9, D14, D12, D2 and D8 as well as resistor R17 in the control circuit 230 are also meant to show alternative design solution/set ups for the realization of the control circuit.

Figure 5:
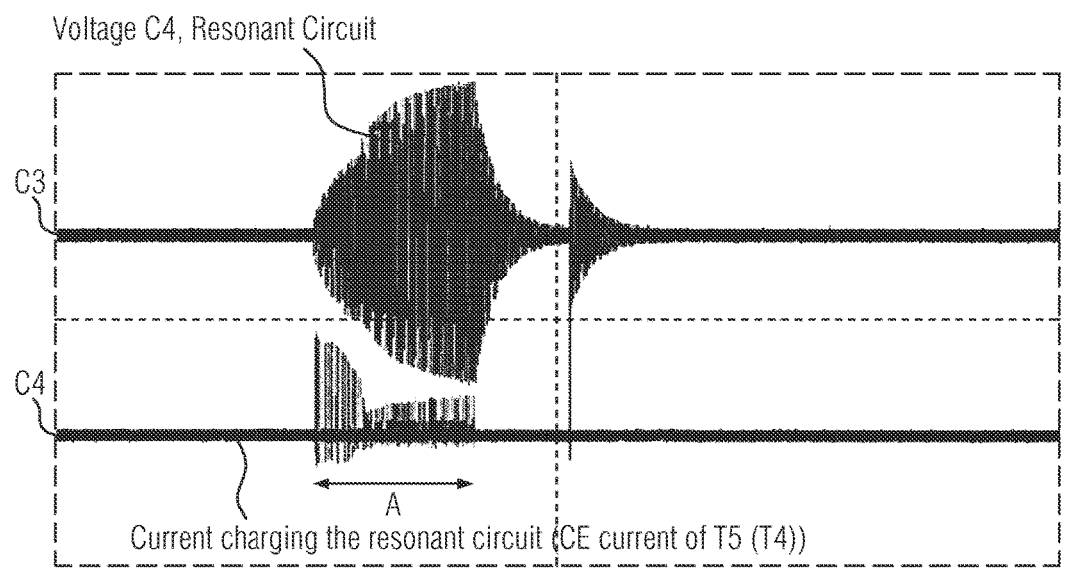
FIG. 5 shows a wave form detected across the resonant circuit under no load conditions and an input voltage of 120 Volts on a scale of 500 μs/div according to an embodiment of the present invention.

FIG. 5 shows a wave form detected at the resonant circuit (TP2 to TP14) under no load conditions and an input voltage of 120 Volts on a scale of 500 µs/div. From the plot in FIG. 5 it is possible to understand how the detection of the load/no-load conditions is performed. After the amplification of the resonant circuit 221 is activated ($T_{ON}$ period), the resonant circuit start oscillating and the waveform in the upper portion of the plot (dark gray signal) is detected. As can be seen from the waveform, no attenuation of a side of the waveform (such as the negative and or positive half side of the waveform) can be detected. Therefore, the peak voltage value measured by the control circuit will not vary with respect to the threshold reference voltage. Thus the control circuit 230 detects a no-load condition and stops amplification. During the on time of the amplification ($T_{ON}$ period indicated in the plot with the letter A), the energy inside the resonant circuit 221 increases, since there is no attenuation due to the load. When the amplification is stopped by the control circuit 230, the voltage in the capacitor C4 decreases rapidly again. The light gray signal indicates the current flow through the switching transistor T5 during the amplification time.

Figure 6:
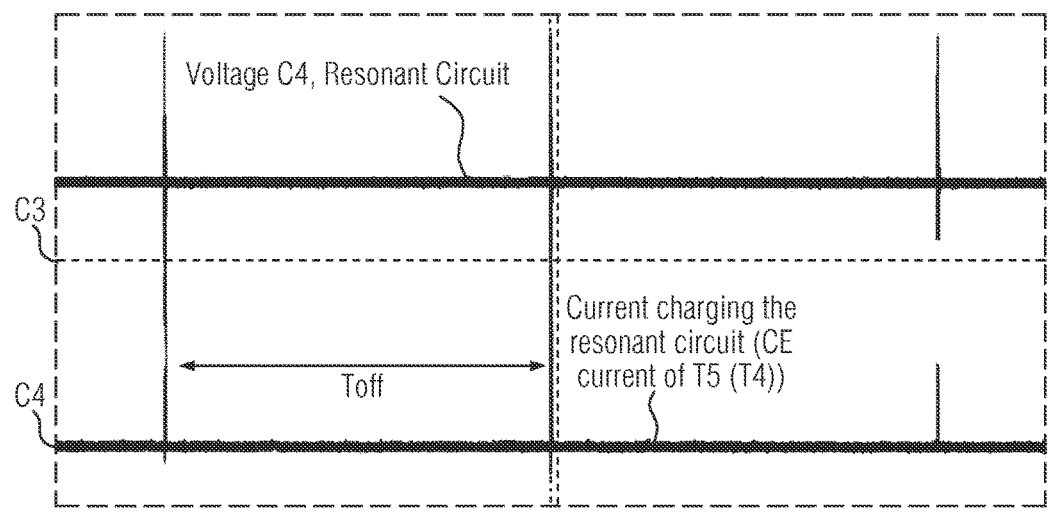
FIG. 6 a plot of the same wave form depicted in FIG. 5 at a time scale of 100 ms/div.

FIG. 6 shows a plot of the same wave form depicted in FIG. 5 at a time scale of 100 ms/div. This shows the off and on times during detection mode. FIG. 5 shows the short detection period and in FIG. 6 the ratio of detection and power saving restart time can be seen. Due to the larger time scale of the plot FIG. 6 allows to understand the amplification cycles of the resonant circuit. $T_{OFF}$ indicates the period of time during which the resonant circuit is not amplified. The peaks in the waveforms plotted in FIG. 6 indicate the periods of time during which amplification is switched off. During $T_{OFF}$ time, current consumption is clearly reduced, since no additional current flows through the transistor T5 to the resonant circuit. As can be derived from the figure, under no-load condition, the $T_{OFF}$ time is much longer than the $T_{ON}$ time over a full operation cycle of the power transmission device.

FIG. 7 shows a waveform over the resonant circuit (TP2 to TP14) during amplification and the corresponding current through D4 (T5) for an input voltage of 120 V under charging conditions and at a time scale of 5 µs/div. The zero voltage switching can be seen within this plot at the moment the voltage rises 0V after been negative. There the voltage is hold on 0V for a short period of recharging the resonant circuit. This waveform is indicated in the plot as the voltage oscillation of the capacitor C4 to GND forming the resonant circuit. From the waveform in FIG. 7 it is possible to see the amplification performed by the transistor T5. Specifically, the waveform oscillates with a DC off-set of 120 Volts. When the sum voltage of the capacitor C4 and the intermediate voltage (operating voltage) is below GND, the transistor T5 is at zero voltage and will therefore be switched on. The transistor goes in a conducting state until the voltage rises above GND level. After rising above GND voltage level, for a short time, additional current flows to the resonant circuit, thereby realizing the amplification of the resonant circuit. The level of amplification is regulated by sensing the current through its voltage drop at the resistors R11 and R12. The B pin of the IC 231 switches the transistor T5 but also senses the voltage applied on this pin. This voltage, from which the transistor base-emitter voltage is subtracted, is linear with the current and compared with an IC internal threshold which as soon as reached will force the driver stage to switch off The signal plotted in FIG. 7 is measured on the winding L1– (TP2) of the coil to GND (TP14), but the detection is done across the winding L2 of the primary coil. However, since the primary and the secondary coils are magnetically coupled, the signal on the windings L1 and L2 is the same.

FIG. 8 shows the same wave form depicted in FIG. 7 and the corresponding current through the switching transistor T5 taken at a different timescale. The wave form is plotted at a time scale of 2 ms/div to show the permanent oscillation during charging mode. From this figure it thus possible to see the evolution of the signal output from the resonant circuit during permanent operation of the power transmission device 200.

Figure 9:
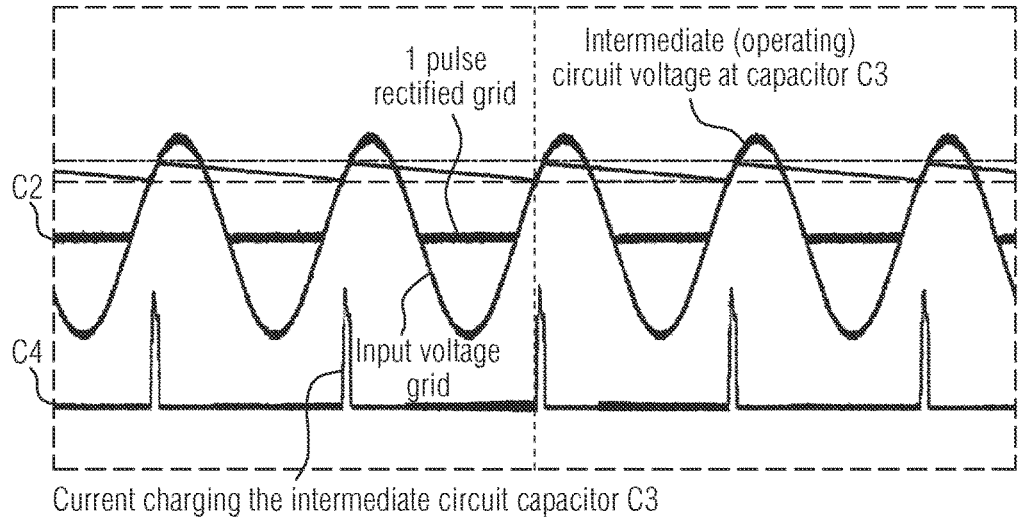
FIG. 9 is a plot of input voltage grid (120 Vrms), the rectified input voltage and the intermediate constant voltage supplied to the resonant circuit during charge of the target device.

FIG. 9 shows the operation of the dimming circuit 210 at an input voltage of 120 Vrms under load condition. The light grey waveform shows the input voltage from the electricity grid. The dark grey waveform depicts the one pulse rectified signal that is used to generate the intermediate predefined operating voltage stored in the capacitor C12. The time evolution of the charge in the capacitor C12 is shown by the dark line. Under load conditions, the charge in the capacitor C12 is discharged to feed the resonant circuit. When the voltage in the capacitor C12 reaches a minimum value, the capacitor C12 is re-charged by a current flowing for a short time through the transistor T3.

Figure 10:
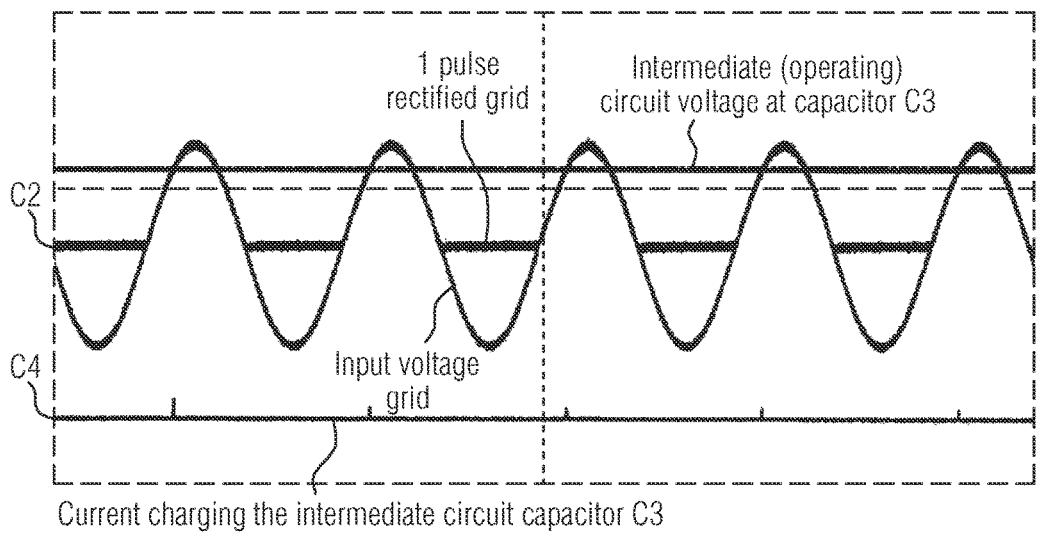
FIG. 10 shows the same parameters depicted in FIG. 9 detected under no-load conditions.

FIG. 10 shows the operation of the dimming circuit 210 at an input voltage of 120 Vrms under no-load. As already explained with reference to FIG. 9, the light grey waveform shows the input voltage from the electricity grid. The dark grey waveform depicts the one pulse rectified signal that is used to generate the intermediate predefined operating voltage stored in the capacitor C12. The time evolution of the charge in the capacitor C12 is shown by the dark line. In this case, since no load is coupled to the power transmission device 200, the capacitor C12 is not periodically discharged and therefore there are no periodic current peaks for re-charging the capacitor C12.

FIG. 11 shows a circuital scheme of the ASIC element MC40B 231 implemented in the control circuit 230 as detecting circuit 231. The pin VP of the ASIC 231 is connected to the capacitor C5. The pin D of MC40B is receives on high ohmic impedance through the diode D11 (or alternatively D6) and D15 as well as the resistors R14, R16 and R15 the sine half wave from the winding L2. As already described before, inside the ASIC 231 there are several fix reference voltages. The collector current of the transistor T5 is sensed through a driver output pin B of the ASIC MC40B. The detecting circuit 231 includes a constant current push pull circuit 2311. When the switching transistor T5 is switched on using the constant current push pull circuit 2311, the voltage at the output pin of the ASIC is the sum of the Base-Emitter voltage of the transistor T5 and the voltage drop across the resistors R11 and R12. The recharging current of the resonant circuit flows through these resistors and generates a voltage. This voltage is the voltage measured at the pin B and may be 4.1V. The voltage measured at pin B forces the current push pull circuit 2311 to switch off the transistor T5 so as to stop amplification.

In conclusion, the present invention provides a power transmission device that comply with the latest regulations in terms of energy consumption and that can be used with a wide-range of supply input voltages. Specifically, the present invention allows reducing the losses of the power transmission device under no-load as well as other modes like e.g. battery full mode condition. This is obtained by providing the power transmission device with a control circuit configured to monitor a parameter of the resonant circuit of the power transmission device and control amplification of the resonant circuit based on the value of said parameter. Specifically, based on the variation of said parameter, the control circuit can detect the presence or not of a magnetic coupling between the power transmission device and the target device. If such a magnetic coupling is detected, the control circuit starts a continuous amplification of the resonant circuit, thereby increasing the efficiency of energy transfer between the power transmission device and the target device. Additionally the efficiency is even more increased by the zero voltage switching. On the other hand, when the control circuit detects no magnetic coupling between the power transmission device and the target device, amplification is stopped so as to reduce no-load energy consumption of the power transmission device.

The invention claimed is:

1. A power transmission device for inductive energy transfer, wherein the power transmission device comprises:
    a first stage adapted to be connected to a supply input voltage and adapted to convert the supply input voltage to an operating voltage;
    a second stage including a resonant circuit connected to the first stage and adapted to generate an oscillating voltage from the operating voltage so as to generate a magnetic field for inductive transfer of energy from the power transmission device to a target device;
    a control circuit connected to the second stage, the control circuit being adapted to detect a parameter value of the second stage, the detected parameter indicating whether the target device is being recharged or not, and adapted to start or stop amplification of the resonant circuit based on the detected parameter value;
    wherein the resonant circuit is composed by the parallel connection of a capacitor with a winding of a transfer coil and a magnetically coupled sensing coil, both coils being wound around a core and serving as primary coils for inductively transferring energy to the target device including a secondary coil, and
    wherein the control circuit is configured to detect the parameter value of the sensing coil;
    wherein the second stage further includes a switching element connected to the resonant circuit, the switching element being adapted to amplify the oscillations of the resonant circuit so as to start or stop amplification of the resonant circuit;
    wherein the control circuit is adapted to detect an oscillation voltage value of the sensing coil of the resonant circuit and to switch the switching element in-phase with the oscillations of the resonant circuit so as to amplify the oscillation of the resonant circuit, the switching of the switching element being performed as zero-voltage switching amplification of the resonant circuit.

2. The power transmission device of claim 1, wherein the control circuit compares the detected parameter with a predefined threshold value and starts or stops amplification based on the comparison result.

3. The power transmission device of claim 1, wherein the parameter value is a mean voltage value across the resonant circuit and the control circuit is configured to start amplification of the resonant circuit if an actual mean voltage is below a voltage threshold value.

4. The power transmission device of claim 1, wherein the parameter value is a peak voltage value across the resonant circuit and wherein the control circuit senses the peak voltage and is configured to start amplification of the resonant circuit if the sensed peak voltage is below a voltage threshold value.

5. The power transmission device of claim 1, wherein the parameter value comprises a peak voltage value and the rising time thereof across the resonant circuit and wherein the control circuit senses the peak voltage and the rising time and is configured to start amplification of the resonant circuit if the sensed peak voltage and rising time is below a voltage threshold value after a specified time.

6. The power transmission device of claim 3, wherein the voltage threshold value is a previously measured parameter value and the control circuit is configured to start amplification if the actual parameter input is bigger or smaller than the previously measured parameter value.

7. The power transmission device of claim 1, wherein the parameter value is an input current input from the first stage to the second stage and the control circuit is configured to start amplification of the resonant circuit if an actual sensed input current is larger than a current threshold value.

8. The power transmission device of claim 7, wherein the current threshold value is a previously measured current input to the second stage and the control circuit is configured to start amplification of the resonant circuit when the actual input current is larger than the previously measured input current.

9. The power transmission device of claim 1, wherein the second stage further includes a switching element connected to the resonant circuit, the switching element being adapted to amplify so as to start or stop amplification of the resonant circuit.

10. The power transmission device of claim 9, wherein the switching element is switched off for stopping amplification of the resonant circuit.

11. The power transmission device of claim 9, wherein the amplification and/or switching element is switched on for starting amplification of the resonant circuit.

12. The power transmission device of claim 1, wherein the first stage includes a dimming section configured to increase or decrease the input voltage to a predefined operating direct current voltage.

13. The power transmission device of claim 12, wherein the dimming section includes a high ohmic MOSFET element and/or the resonant circuit includes a capacitor and a choke connected in parallel or series.

14. The power transmission device of claim 1, wherein the control circuit stops amplification for a predefined off-time, the ratio of the off-time with a period of the oscillating signal being chosen so as to minimize losses of the first stage.

15. A system for inductive energy transfer, the system comprising:
    a power transmission device according to claim 1; and
    a target device adapted to be magnetically coupled to the power transmission device for transfer of energy from the power transmission device to the target device.

16. The system for inductive energy transfer of claim 15, wherein the power transmission device senses an opposing magnetic field of a power receiving coil in the target device to which the power is transferred, the opposing magnetic field being sensed through the detected parameter value.

17. The system for inductive energy transfer of claim 16 wherein a magnetic decoupling of the power receiving coil is activated by switching the power receiving coil electrically to a high ohmic load and/or by electrically opening one or both wire ends of the power receiving coil to disconnect said one or both wire ends from the low ohmic load, wherein the magnetic decoupling triggers the less power consuming no-load mode.

18. The power transmission device of claim 1, wherein the control circuit is configured to detect a parameter of a signal that is supplied via the sensing coil and subsequently delayed via a RC circuit element.

19. The power transmission device of claim 1, wherein the control circuit is configured to detect a parameter of a signal that is supplied via the sensing coil and is subsequently rectified via a diode.

* * * * *